United States Patent
Gehret et al.

(10) Patent No.: US 11,936,327 B2
(45) Date of Patent: Mar. 19, 2024

(54) HYBRID POWER SYSTEM WITH ELECTRIC GENERATOR AND AUXILIARY POWER SOURCE

(71) Applicant: Tecogen Inc., Waltham, MA (US)

(72) Inventors: Joseph Gehret, North Reading, MA (US); Robert A. Panora, Cambridge, MA (US); Jian Wen, North Andover, MA (US)

(73) Assignee: Tecogen Inc., Waltham, MA (US)

( * ) Notice: Subject to any disclaimer, the term of this patent is extended or adjusted under 35 U.S.C. 154(b) by 82 days.

(21) Appl. No.: 17/808,430

(22) Filed: Jun. 23, 2022

(65) Prior Publication Data

US 2022/0416700 A1     Dec. 29, 2022

Related U.S. Application Data

(60) Provisional application No. 63/214,019, filed on Jun. 23, 2021.

(51) Int. Cl.
   *H02P 9/02*    (2006.01)
   *H02J 3/00*    (2006.01)

(52) U.S. Cl.
   CPC . *H02P 9/02* (2013.01); *H02J 3/00* (2013.01)

(58) Field of Classification Search
   CPC . H02P 9/02; H02J 3/00; H02J 2300/10; H02J 3/381
   See application file for complete search history.

(56) References Cited

U.S. PATENT DOCUMENTS

| | | |
|---|---|---|
| 3,944,837 A | 3/1976 | Meyers et al. |
| 3,949,359 A | 4/1976 | Sorkin |
| 3,955,358 A | 5/1976 | Martz et al. |

(Continued)

FOREIGN PATENT DOCUMENTS

| | | |
|---|---|---|
| EP | 1761984 B1 | 3/2013 |
| JP | 2006141145 A | 6/2006 |

(Continued)

OTHER PUBLICATIONS

EPO, "Extended European Search Report—App. No. 16002163.0-1603", dated Mar. 14, 2017, European Patent Office.

(Continued)

*Primary Examiner* — Pedro J Cuevas
(74) *Attorney, Agent, or Firm* — Intrinsic Law Corp.

(57) ABSTRACT

A hybrid power-generator system includes an engine, an electric generator, first and second rectifiers, first and second DC-DC voltage converters, a DC bus, an inverter, and one or more controllers. The system provides a unique method of joining two power sources such that the relative proportion utilized can be changed to any value seamlessly, such as to avoid daily and/or seasonal variations in utility charges. Since the AC output portion of the circuit is independent of the utility grid, power can be supplied at variable frequencies to motor loads with significant positive impacts in load efficiency. Power increases required by the load(s) that occur rapidly can utilize the electrical grid to assist for the brief transient, allowing the engine, which is maintained at a fixed and wide-open-throttle position, to continue operation and in a more gradual process to resume its blend target for power generation.

15 Claims, 9 Drawing Sheets

(56) References Cited

U.S. PATENT DOCUMENTS

| | | |
|---|---|---|
| 3,974,644 A | 8/1976 | Martz et al. |
| 4,028,884 A | 6/1977 | Martz et al. |
| 4,031,404 A | 6/1977 | Martz et al. |
| 4,039,846 A | 8/1977 | Vance |
| 4,164,660 A | 8/1979 | Palazzetti |
| 4,209,829 A | 6/1980 | Leichle |
| 4,221,982 A | 9/1980 | Raver et al. |
| 4,226,214 A | 10/1980 | Palazzetti |
| 4,240,581 A | 12/1980 | Fowler |
| 4,275,311 A | 6/1981 | Agazzone et al. |
| 4,464,593 A | 8/1984 | Kofink |
| 4,503,337 A | 3/1985 | Häfner et al. |
| 4,510,756 A | 4/1985 | Hise et al. |
| 4,617,890 A | 10/1986 | Kobayashi et al. |
| 4,739,204 A | 4/1988 | Kitamura et al. |
| 4,752,697 A | 6/1988 | Lyons et al. |
| 4,818,906 A | 4/1989 | Kitamura et al. |
| 4,870,307 A | 9/1989 | Kitamura et al. |
| 4,922,148 A | 5/1990 | Kitamura |
| 4,980,588 A | 12/1990 | Ogawa |
| 5,003,788 A | 4/1991 | Fischer |
| 5,232,061 A | 8/1993 | Neeleman |
| 5,422,518 A | 6/1995 | Sashida |
| 5,432,710 A | 7/1995 | Ishimaru et al. |
| 5,536,976 A | 7/1996 | Churchill |
| 5,646,510 A | 7/1997 | Kumar |
| 5,836,270 A | 11/1998 | Aoki et al. |
| 5,907,238 A | 5/1999 | Owerko et al. |
| 6,160,332 A | 12/2000 | Tsuruhara |
| 6,169,344 B1 | 1/2001 | Tsuruhara |
| 6,218,747 B1 | 4/2001 | Tsuruhara |
| 6,274,941 B1 | 8/2001 | Ryhiner |
| 6,290,142 B1 | 9/2001 | Togawa et al. |
| 6,305,170 B1 | 10/2001 | Kitani et al. |
| 6,324,849 B1 | 12/2001 | Togawa et al. |
| 6,367,260 B1 | 4/2002 | Kasai et al. |
| 6,435,420 B1 | 8/2002 | Kasai et al. |
| 6,612,112 B2 | 9/2003 | Gilbreth et al. |
| 6,639,328 B2 | 10/2003 | Wacknov |
| 6,657,332 B2 | 12/2003 | Balas |
| 6,700,236 B2 | 3/2004 | Umeda et al. |
| 6,748,742 B2 | 6/2004 | Rouse et al. |
| 6,751,941 B2 | 6/2004 | Edelman et al. |
| 6,787,933 B2 | 9/2004 | Claude et al. |
| 6,801,019 B2 | 10/2004 | Haydock et al. |
| 6,807,074 B2 | 10/2004 | Ollila et al. |
| 6,812,587 B2 | 11/2004 | Gilbreth et al. |
| 6,815,934 B2 | 11/2004 | Colley |
| 6,832,488 B2 | 12/2004 | Yokozeki et al. |
| 6,838,781 B2 | 1/2005 | van de Loo |
| 6,844,700 B2 | 1/2005 | Sakai et al. |
| 6,845,020 B2 | 1/2005 | Deng et al. |
| 6,847,129 B2 | 1/2005 | McKelvey et al. |
| 6,879,053 B1 | 4/2005 | Welches et al. |
| 6,913,068 B2 | 7/2005 | Togawa et al. |
| 6,966,185 B2 | 11/2005 | Shimada et al. |
| 7,040,544 B2 | 5/2006 | Guyer |
| 7,064,454 B2 | 6/2006 | Fukaya et al. |
| 7,127,896 B2 | 10/2006 | Shimada et al. |
| 7,145,258 B2 | 12/2006 | Kang et al. |
| 7,170,191 B2 | 1/2007 | Kang et al. |
| 7,181,919 B2 | 2/2007 | Uno et al. |
| 7,239,034 B2 | 7/2007 | Gehret, Jr. |
| 9,376,958 B1 * | 6/2016 | Bonora ................... H02J 3/381 |
| 9,702,306 B2 | 7/2017 | Gehret et al. |
| 10,666,054 B2 * | 5/2020 | Wilson ...................... G05F 1/66 |
| 10,784,686 B2 * | 9/2020 | Schneider .............. H02J 3/241 |
| 2001/0048290 A1 | 12/2001 | Underwood et al. |
| 2002/0030365 A1 | 3/2002 | Underwood et al. |
| 2002/0153127 A1 | 10/2002 | Togawa et al. |
| 2003/0015873 A1 | 1/2003 | Khalizadeh et al. |
| 2003/0209909 A1 | 11/2003 | Fukaya et al. |
| 2004/0000820 A1 | 1/2004 | Cromas et al. |
| 2004/0045594 A1 | 3/2004 | Hightower |
| 2004/0080164 A1 | 4/2004 | McKelvey et al. |
| 2004/0124638 A1 | 7/2004 | van de Loo |
| 2005/0023909 A1 | 2/2005 | Cromas et al. |
| 2005/0080527 A1 | 4/2005 | Tao et al. |
| 2005/0080535 A1 | 4/2005 | Steinmetz et al. |
| 2005/0080537 A1 | 4/2005 | Cawthorne et al. |
| 2005/0080540 A1 | 4/2005 | Steinmetz et al. |
| 2005/0080541 A1 | 4/2005 | Sah et al. |
| 2005/0140142 A1 | 6/2005 | Welches et al. |
| 2005/0189918 A1 | 9/2005 | Weisgerber et al. |
| 2005/0206167 A1 | 9/2005 | Gehret, Jr. |
| 2005/0255964 A1 | 11/2005 | Heap et al. |
| 2005/0256623 A1 | 11/2005 | Hubbard et al. |
| 2006/0037742 A1 | 2/2006 | Kim et al. |
| 2006/0207262 A1 | 9/2006 | Firey |
| 2006/0288720 A1 | 12/2006 | Jmaev |
| 2007/0028611 A1 | 2/2007 | Johnston et al. |
| 2007/0044481 A1 | 3/2007 | Rabovitser et al. |
| 2007/0069521 A1 | 3/2007 | Jabaji et al. |
| 2009/0084618 A1 | 4/2009 | Thompson et al. |
| 2012/0139241 A1 * | 6/2012 | Haj-Maharsi ........... F03D 9/257 290/44 |
| 2013/0179052 A1 | 7/2013 | Kawakami et al. |
| 2015/0066438 A1 | 3/2015 | Brooks et al. |
| 2016/0036236 A1 * | 2/2016 | Teichmann ............. H02J 3/381 307/31 |
| 2016/0111879 A1 * | 4/2016 | Ayana ...................... H02J 3/40 307/64 |
| 2017/0133852 A1 | 5/2017 | Macdonald |
| 2018/0366952 A1 * | 12/2018 | Wilson .................... H02J 3/381 |
| 2019/0173285 A1 * | 6/2019 | Schneider ............... H02J 3/381 |
| 2021/0305813 A1 * | 9/2021 | Lucas ...................... H02J 3/18 |
| 2023/0208186 A1 * | 6/2023 | Topaloglu .............. H02J 9/062 361/622 |

FOREIGN PATENT DOCUMENTS

| | | | |
|---|---|---|---|
| JP | 6377696 B2 | 8/2018 | |
| WO | WO2015092480 A1 | 6/2015 | |
| WO | WO-2016060839 A1 * | 4/2016 | ............... H02J 3/18 |
| WO | WO-2023057462 A1 * | 4/2023 | ........ H02J 13/00002 |

OTHER PUBLICATIONS

JPO, "Notice of Reasons for Refusal" Patent Application No. 2016-200489, dated Jul. 4, 2017, Japan Patent Office.

International Search Report for PCT Application No. PCT/US2022/073111, dated Sep. 29, 2022.

\* cited by examiner

HYBRID POWER SYSTEM WITH ELECTRIC GENERATOR AND AUXILIARY POWER SOURCE

CROSS-REFERENCE TO RELATED APPLICATIONS

This application claims priority to U.S. Provisional Application No. 63/214,019, titled "High Efficiency Hybrid Engine-Driven Variable-Frequency Drive," filed Jun. 23, 2021, which is hereby incorporated by reference.

TECHNICAL FIELD

This application relates generally to power generation systems.

BACKGROUND

Combined heat and power (CHP) systems can be used to generate heat energy for a building while simultaneously providing electric power back to the power grid. The CHP systems include a generator that is driven by an engine. Power modulation is accomplished by altering the engine rotational speed (or RPMs) without throttling—by modulating current exported by the system to the grid—which is significantly more efficient. This approach to power modulation is feasible in the great majority of applications because the inverter output is directed to the local utility grid whose relative scale far exceeds the CHP system. This scale discrepancy allows the CHP system to inject electricity into the grid without regard to exactly maintaining the prescribed power output so long as the voltage waveforms are synchronized.

It would be desirable to use the power output of the CHP system to drive one or more isolated loads such as motors or lighting, which have specific power requirements. The control strategy used on the CHP system will not work since the power requirement(s) for the isolated load (s) must be met exactly. This prevents the power output from being used as a controlling parameter. If the connected device were to instantaneously increase its power demand with the engine operating at wide-open throttle, the engine would stall.

SUMMARY

Example embodiments described herein have innovative features, no single one of which is indispensable or solely responsible for their desirable attributes. The following description and drawings set forth certain illustrative implementations of the disclosure in detail, which are indicative of several example ways in which the various principles of the disclosure may be carried out. The illustrative examples, however, are not exhaustive of the many possible embodiments of the disclosure. Without limiting the scope of the claims, some of the advantageous features will now be summarized. Other objects, advantages and novel features of the disclosure will be set forth in the following detailed description of the disclosure when considered in conjunction with the drawings, which are intended to illustrate, not limit, the invention.

An aspect of the invention is directed to a hybrid power-generator system comprising an engine that runs with a wide-open throttle; an electric generator mechanically coupled to the engine to produce a generator alternating current (AC) having a frequency; a first rectifier having an input that is electrically coupled to an output of the electric generator, the first rectifier configured to rectify the generator AC to a generator direct current (DC); a second rectifier having an input that is electrically coupled to an electric grid to receive a grid AC, the second rectifier configured to rectify the grid AC to a grid DC; a first DC-DC voltage converter having an input that is electrically coupled to an output of the first rectifier to receive the generator DC; a second DC-DC voltage converter having an input that is electrically coupled to an output of the second rectifier to receive the grid DC; a DC bus electrically coupled to an output of the first DC-DC voltage converter and to an output of the second DC-DC voltage converter; an inverter electrically coupled to the DC bus, the inverter supplying an inverter AC to a load motor; a first controller that receives as inputs a grid power target signal and a grid power feedback signal and produces an engine speed target signal based, at least in part, on the grid power target signal and the grid power feedback signal; and a second controller that receives as inputs the engine speed target signal, an engine speed feedback signal, a DC bus voltage feedback signal, and a DC bus target voltage signal, and produces first and second duty-cycle output signals based, at least in part, on the engine speed target signal, the engine speed feedback signal, the DC bus voltage feedback signal, and the DC bus target voltage signal, wherein: the first duty-cycle output signal sets a duty cycle of the first DC-DC voltage converter, the second duty-cycle output signal sets a duty cycle of the second DC-DC voltage converter, and the duty cycle of the first DC-DC voltage converter causes the engine to operate at a corresponding speed.

In one or more embodiments, the grid power target signal indicates a target grid power from the electric grid, the grid power feedback signal indicates an actual grid power from the electric grid, and the first controller produces the engine speed target signal based, at least in part, on a difference between the target grid power and the actual grid power. In one or more embodiments, the first controller includes a proportional-integral-derivative controller.

In one or more embodiments, the engine speed target signal corresponds to a target speed of the engine, the engine speed feedback signal corresponds to an actual speed of the engine, the DC bus voltage feedback signal corresponds to an actual voltage of the DC bus, the DC bus target voltage signal corresponds to a target voltage of the DC bus, and the second controller produces the first and second duty-cycle output signals based, at least in part, on a difference between the target speed and the actual speed of the engine and a difference between the target voltage and the actual voltage of the DC bus.

In one or more embodiments, the second controller includes: a first proportional-integral-derivative (PID) controller that receives as an input an engine speed difference signal that corresponds to the difference between the target speed and the actual speed of the engine, the first PID controller producing a first output signal; a second PID controller that receives as an input a DC bus voltage difference signal that corresponds to the difference between the target voltage and the actual voltage of the DC bus, the second PID controller producing a second output signal; a current controller that receives as inputs the first and second output signals, the current controller producing first and second reference currents; a third PID controller that receives as an input a first current difference signal that corresponds to a difference between the first reference current and the generator DC, the third PID controller producing the first duty-cycle output signal; and a fourth PID controller that receives as an input a second current difference signal that corresponds to a difference between the second reference current and the grid DC, the fourth PID controller producing the second duty-cycle output signal.

In one or more embodiments, the second controller includes: a first pulse-width modulator (PWM) that receives as an input the first duty-cycle output signal, the first PWM producing a first pulse-width modulated signal based on the first duty-cycle output signal; and a second PWM that receives as an input the second duty-cycle output signal, the second PWM producing a second pulse-width modulated signal based on the second duty-cycle output signal, wherein: the first DC-DC voltage converter is configured to convert a voltage of the generator DC using the first pulse-width modulated signal, the first pulse-width modulated signal having the first duty cycle, and the second DC-DC voltage converter is configured to convert a voltage of the grid DC using the second pulse-width modulated signal, the second pulse-width modulated signal having the second duty cycle. In one or more embodiments, the second controller includes a first current-limit circuit that receives as an input the first current difference signal and that produces as an output: the first current difference signal when a target generator DC is less than or equal to a maximum generator DC, and a first maximized current difference signal when the target generator DC is greater than the maximum generator DC. In one or more embodiments, the second controller includes a second current-limit circuit that receives as an input the second current difference signal and that produces as an output: the second current difference signal when a target grid DC is less than or equal to a maximum grid DC, and a second maximized current difference signal when the target grid DC is greater than the maximum grid DC.

In one or more embodiments, the inverter is a first inverter, the load motor is a first load motor, the inverter AC is a first inverter AC, and the system further comprises a second inverter electrically coupled to the DC bus, the second inverter supplying a second inverter AC to a second load motor. In one or more embodiments, the load motor is a first load motor, and the system further comprises a third DC-DC converter electrically coupled to the DC bus, the third DC-DC converter supplying a DC power to a second load motor. In one or more embodiments, the engine and the electric generator are components of a combined heat and power system.

In one or more embodiments, the system further comprises a combined controller that includes the first and second controllers.

Another aspect of the invention is directed to a hybrid power-generator system comprising: an engine that runs with a wide-open throttle; an electric generator mechanically coupled to the engine to produce a generator direct current (DC) having a generator voltage; a rectifier having an input that is electrically coupled to an electric grid to receive a grid AC, the rectifier configured to rectify the grid AC to a grid DC; a first DC-DC voltage converter having an input that is electrically coupled to an output of electric generator to receive the generator DC; a second DC-DC voltage converter having an input that is electrically coupled to an output of the rectifier to receive the grid DC; a DC bus electrically coupled to an output of the first DC-DC voltage converter and to an output of the second DC-DC voltage converter; an inverter electrically coupled to the DC bus, the inverter supplying an inverter AC to a load motor; a first controller that receives as inputs a grid power target signal and a grid power feedback signal and produces an engine speed target signal based, at least in part, on the grid power target signal and the grid power feedback signal; and a second controller that receives as inputs the engine speed target signal, an engine speed feedback signal, a DC bus voltage feedback signal, and a DC bus target voltage signal, and produces first and second duty-cycle output signals based, at least in part, on the engine speed target signal, the engine speed feedback signal, the DC bus voltage feedback signal, and the DC bus target voltage signal, wherein: the first duty-cycle output signal sets a duty cycle of the first DC-DC voltage converter, the second duty-cycle output signal sets a duty cycle of the second DC-DC voltage converter, and the duty cycle of the first DC-DC voltage converter causes the engine to operate at a corresponding speed.

Another aspect of the invention is directed to a hybrid power-generator system comprising: an engine that runs with a wide-open throttle; an electric generator mechanically coupled to the engine to produce a generator alternating current (AC) having a frequency; a first rectifier having an input that is electrically coupled to an output of the electric generator, the first rectifier configured to rectify the generator AC to a generator direct current (DC); a first DC-DC voltage converter having an input that is electrically coupled to an output of the first rectifier to receive the generator DC; a second DC-DC voltage converter having an input that is electrically coupled to an output of an auxiliary DC power source; a DC bus electrically coupled to an output of the first DC-DC voltage converter and to an output of the second DC-DC voltage converter; an inverter electrically coupled to the DC bus, the inverter supplying an inverter AC to a load motor; a first controller that receives as inputs a grid power target signal and a grid power feedback signal and produces an engine speed target signal based, at least in part, on the grid power target signal and the grid power feedback signal; and a second controller that receives as inputs the engine speed target signal, an engine speed feedback signal, a DC bus voltage feedback signal, and a DC bus target voltage signal, and produces first and second duty-cycle output signals based, at least in part, on the engine speed target signal, the engine speed feedback signal, the DC bus voltage feedback signal, and the DC bus target voltage signal, wherein: the first duty-cycle output signal sets a duty cycle of the first DC-DC voltage converter, the second duty-cycle output signal sets a duty cycle of the second DC-DC voltage converter, and the duty cycle of the first DC-DC voltage converter causes the engine to operate at a corresponding speed.

In one or more embodiments, the auxiliary DC power source comprises one or more batteries, one or more supercapacitors, a photovoltaic solar array, or other DC power source.

BRIEF DESCRIPTION OF THE DRAWINGS

For a fuller understanding of the nature and advantages of the concepts disclosed herein, reference is made to the detailed description of preferred embodiments and the accompanying drawings.

DETAILED DESCRIPTION

Figure 1:
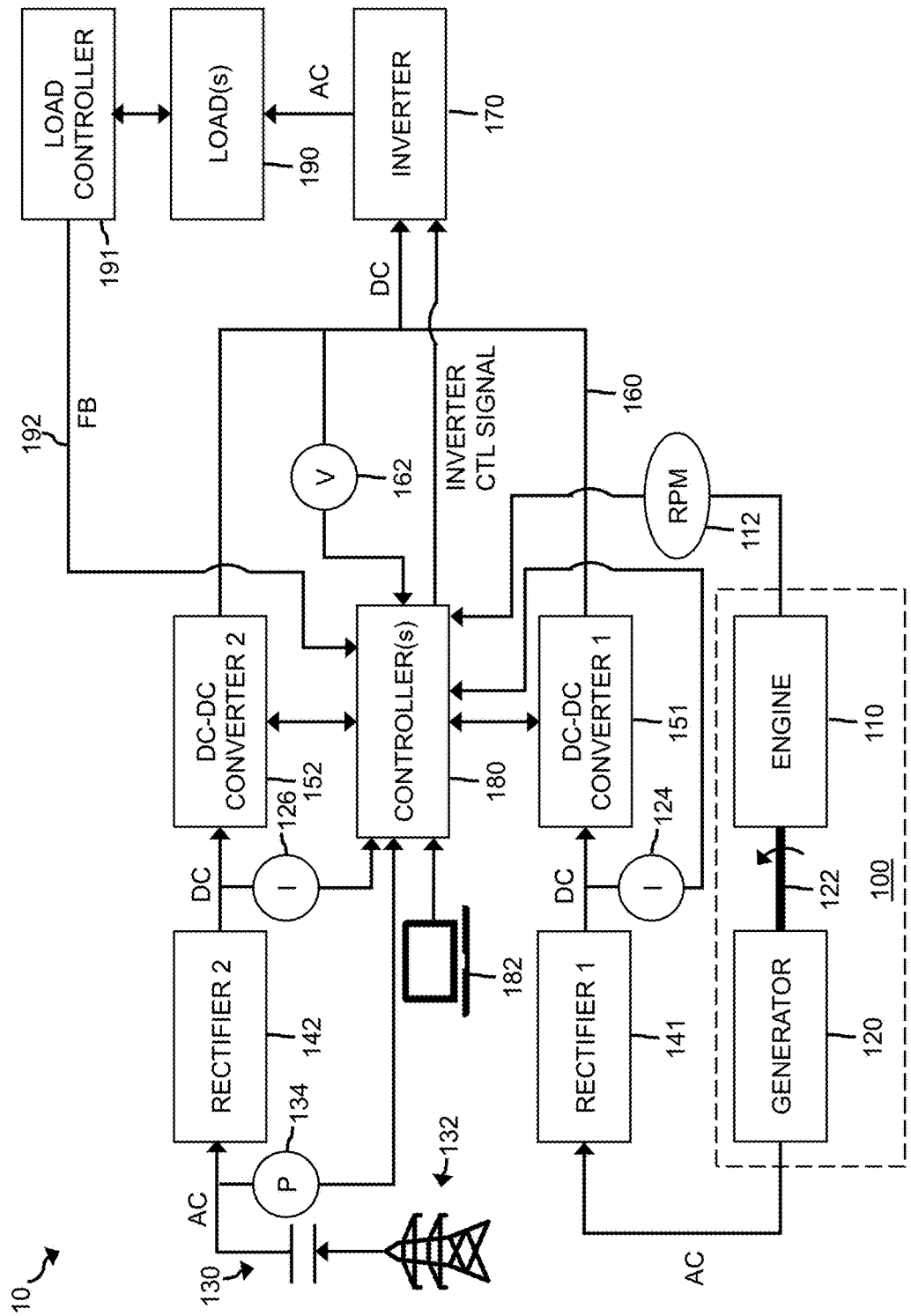
FIG. 1 is a block diagram of a hybrid power system according to an embodiment.

A hybrid system for powering electrical loads includes an engine-driven generator and an auxiliary power connection, such as to the electrical grid. The outputs of the generator and the auxiliary power connections are rectified, if needed, and then the DC voltage is increased (or decreased) to a DC bus voltage with respective first and second DC-DC converters. The DC power from the generator and auxiliary power source is blended in a DC bus that is electrically connected to the outputs of the DC-DC converters. The blended DC power is input to an inverter that produces AC power having a target frequency and voltage for powering one or more loads, such as one or more electric motors.

One or more controllers of the system receives as inputs a target auxiliary power signal, a measured speed of the engine, a measured voltage of the DC bus, a target voltage of the DC bus, and the DC current flowing through each DC-DC converter. The controllers produce first and second pulse-width modulated (PWM) output signals having respective first and second duty cycles. The first PWM output signal is fed back to the first DC-DC converter that is electrically coupled to the generator. The second PWM output signal is fed back to the second DC-DC converter that is electrically coupled to the auxiliary power source. The duty cycles of the first and second PWM output signals determine the blend of power provided by the generator and auxiliary power source, respectively. An increase (or decrease) in the power requirement of the generator causes a corresponding increase (or decrease) in the speed of the engine, which operates with a wide-open throttle for maximum efficiency.

The power for the system can be provided solely by the engine-generator system, solely by the electrical grid (or other auxiliary power source), or as a customized blend of power from the engine-generator system and from the electrical grid. The proportion of blended energy from each source can be controlled such that either source can be used exclusively or, as desired, in some other proportion. The blend may be adjusted from time to time as electric utility or gas utility rates change or to adjust the engine-generator power, and thereby its heat output, to meet the thermal demand of any connected heating loads. The blend may also be adjusted to minimize the total carbon footprint of the connected electric and thermal loads or to adjust carbon dioxide production for beneficial plant growth in indoor plant growing facilities.

The controller(s) can respond to sudden changes in power requirements imposed by the connected load(s) by supplying the excess power from the auxiliary power source and slowly allowing the engine-driven generator to rebalance to the desired power blend, thereby preventing engine stall on sudden load changes. The secondary power source can preferably instantaneously supply as much power as required, for example as the electric grid is capable.

The system may include engine waste heat recovery, thereby fulfilling the role of a CHP system. Note that, generally, the system may include but is not limited to engine generators with heat recovery as in CHP systems, therefore CHP systems are but a non-limiting example of systems that may be constructed and operated according to this disclosure.

The output of the inverter (e.g., to the load(s)) can be fixed or supplied at a variable frequency and voltage and can be used to feed single or multiple loads, typically a large motor or group of motors. Conventional variable-frequency drives (VFDs), which alter the frequency of utility power, are commonly used to drive motors used in pumping and gas compression. Lowering the frequency to half of its normal value, for example, will result in the same proportional reduction of fluid flow but with significantly less energy expenditure compared to other flow reduction methods—which is the VFD's main benefit.

In applications which include groups of motors powered simultaneously and where a single frequency is undesirable for some or all conditions, it is possible to provide two or more independent power outputs, each of which can be controlled independently by respective inverters. For example, an air-cooled chiller has two motor load groups—the condenser fans and the refrigeration compressor(s)—which, in general, have dissimilar loading requirements. In this case, separate inverters would allow the compressor and fans to operate at dissimilar frequencies and, therefore, relative loadings, thus providing the lowest energy use possible for the chiller motors for all operating conditions.

FIG. 1 is a block diagram of a hybrid power system 10 according to an embodiment. The system 10 includes an engine 110, a generator 120, an electrical grid connection 130, first and second rectifiers 141, 142, first and second DC-DC voltage converters 151, 152, a DC bus 160, an inverter 170, and one or more controllers 180.

The engine 110 is mechanically coupled to the generator 120, such as by a rotating shaft 122, to drive the generator to produce electric energy. The engine 110 operates with a wide-open throttle (e.g., at a near-stall condition) at variable rotational speed (e.g., variable RPMs). Altering the engine rotational speed is significantly more efficient than engine throttling. The engine 110 can be powered by natural gas, diesel, biofuel, or another fuel. The generator 120 can be a permanent magnet generator or another generator, which can produce alternating-current (AC) electric power. The engine 110 and generator 120 can be components of a CHP system 100.

The electrical grid connection 130 provides an electrical connection to an AC electric source such as a local or regional power grid 132. The electrical grid connection 130 can include a switch (e.g., a solid-state switch, a physical switch, or another switch), a service line, and/or another electrical connection.

The input of the first rectifier 141 is electrically connected to the output of the generator 120. The output of the first rectifier 141 is electrically connected to the input of the first DC-DC voltage converter 151. The output of the first DC-DC voltage converter 151 is electrically connected to the DC bus 160.

The input of the second rectifier 142 is electrically connected to the electrical grid connection 130. The output of the first rectifier 142 is electrically connected to the input of the second DC-DC voltage converter 152. The output of the second DC-DC voltage converter 152 is electrically connected to the DC bus 160. The DC bus 160 is electrically coupled to the input of the inverter 170. The output of the inverter 170 is electrically coupled to one or more motors and/or other electric devices or components or loads 190.

The first and second DC-DC voltage converters 151, 152 are configured to adjust (e.g., decrease or increase) the voltage of the DC output from the first and second rectifiers 141, 142, respectively, to a predetermined value in the DC bus 160 that facilitates the DC-to-AC conversion by the inverter 170. For example, the first DC-DC voltage converter 151 can compensate for DC voltage decreases at lower engine 110 speeds during power modulation. Each DC-DC voltage converter 151, 152 can comprise an insulated-gate bipolar transistor (IGBT) that can actively control the desired blend proportion. The blend proportion can be set so that the DC current flowing into the inverter 170 is solely from the generator 120 (via the first rectifier 141), solely from the power grid 132 (via the electrical grid connection 130 and the second rectifier 142), or from a customizable blend or combination of DC current rectified from the generator 120 and the power grid 132.

The inverter 170 is configured to reform the DC current from the DC bus 160 (e.g., from the first and second DC-DC voltage converters 151, 152) to AC current that has a voltage and frequency in acceptable ranges for the load(s) 190, which can include one or more load motors. The output of the inverter 170 can be either fixed or supplied at a variable frequency and/or voltage and can be used to feed single or multiple loads, typically a large motor or group of motors. For example, the inverter 170 can be a VFD inverter that can vary the frequency of the AC power to the load(s) 190. In some embodiments, the inverter 170 can include one or more IGBTs.

The controller(s) 180 is/are configured to receive as inputs a target grid power signal, the speed of the engine 110, the voltage of the DC bus 160, the DC current flowing through each DC-DC converter 151, 152, and a load controller feedback signal 192. The target grid power signal can be stored on computer memory accessible to the controller(s) 180 and/or input from a system operator through a computer 182. The voltage of the DC bus 160 can be provided to the controller(s) 180 by a voltage sensor 162 that is electrically coupled to the DC bus 160. The speed of the engine 110 can be provided to the controller(s) 180 by a speed sensor 112 that is electrically and/or mechanically coupled to the engine 110 or the shaft 122. The current flowing through each DC-DC converter 151, 152 can be provided to the controller(s) 180 by respective current meters 124, 126 that are electrically coupled to the input line to the respective DC-DC converter 151, 152. The load controller feedback signal 192 can represent or relate to the power requirement(s) of the load(s).

The controller(s) 180 is/are configured to produce a duty-cycle output to each DC-DC converter 151, 152. The duty-cycle outputs determine the blend of energy provided by the generator 120 and the power grid 132 to meet the power requirement(s) of the load(s) 190. In addition, the controller 180 is/are configured to produce an inverter control signal output to the inverter 170. The inverter control signal output can represent or relate to the target power output of the inverter 170. The inverter 170 can modulate the power output to the load(s) 190 by varying (e.g., increasing or decreasing) the AC voltage or AC frequency to achieve a set point prescribed by the external load controller 191.

For example, the load(s) 190 can include motors for an air-conditioning system with compressor and fan motors. An example of the load controller feedback signal 192 is the response of the load controller 191 to the output temperature of the coolant in the air-conditioning system. When the coolant temperature is greater than a predetermined temperature, the controller 191 can vary (e.g., increase) the inverter control signal output to increase the target frequency feedback signal 192, which can cause the inverter 170 to increase the output AC frequency to the load(s) 190. The predetermined temperature can be stored in the memory of the external load controller 191 or in the controller 180. The increase in the output AC frequency to the load(s) 190 causes a corresponding increase in compressor speed of the load(s) 190. The increase in AC frequency will increase the required inverter power which will be supplied by the blended outputs from the generator 120 and the power grid 132. When the coolant temperature is lower than the predetermined temperature, the controller 191 can vary (e.g., decrease) the inverter control signal output to decrease the target frequency feedback signal 192. The decrease in the output AC frequency to the load(s) 190 causes a corresponding decrease in compressor speed of the load(s) 190. The decrease in AC frequency will decrease the required inverter power which will be supplied by the blended outputs from the generator 120 and the power grid 132.

Figure 2:
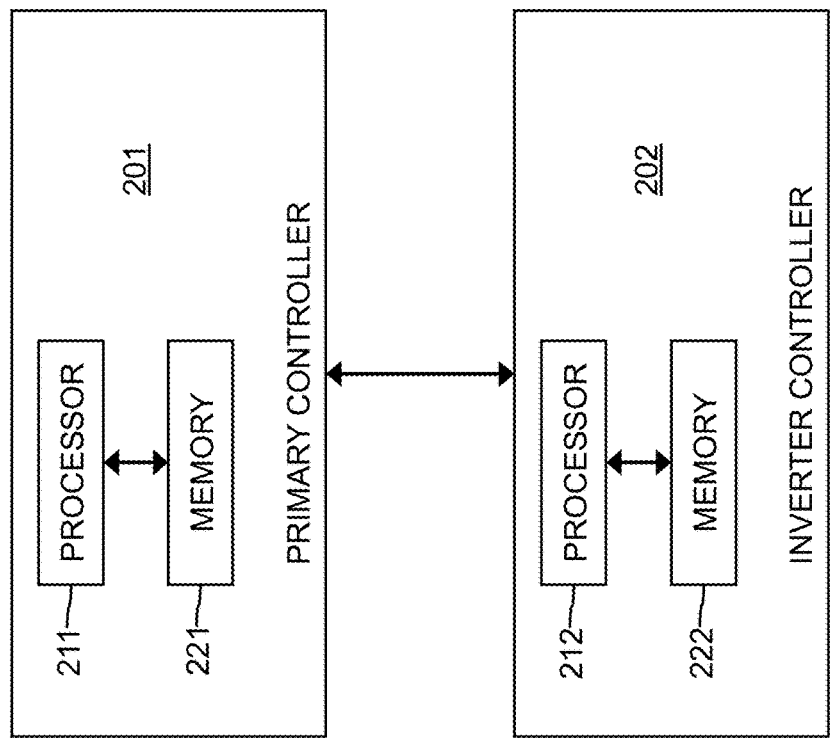
FIG. 2 is a block diagram of the controller(s) illustrated in FIG. 1 according to an embodiment.

FIG. 2 is a block diagram of the controller(s) 180 according to an embodiment in which the controller(s) 180 include two controllers: a primary controller 201 and an inverter controller 202. In another embodiment, the primary and inverter controllers 201, 202 can be combined into a single combined controller.

The primary and inverter controllers 201, 202 include microprocessors 211, 212 and non-transitory computer-readable memory 221, 222, respectively. Each microprocessor 211, 212 is operably and/or electrically coupled to the respective computer-readable memory 221, 222 to access computer-readable instructions that are executable by the respective microprocessor 211, 212 to perform one or more functions and/or tasks as described herein. The primary and inverter controllers 201, 202 are in electrical communication with each other to pass or send data, commands, instructions, and/or other electrical signals to each other.

Figure 3:
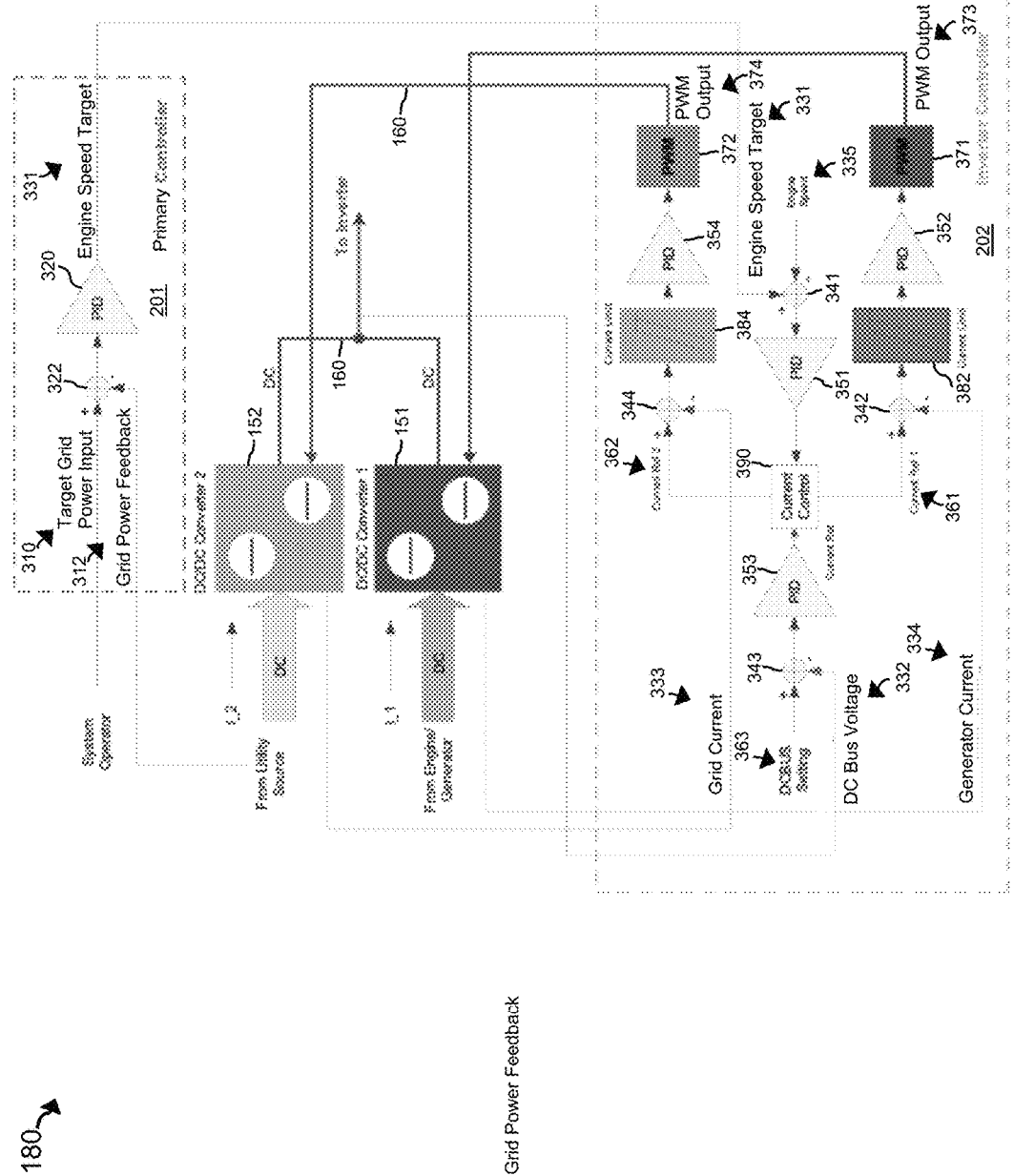
FIG. 3 is a schematic diagram of the functions and/or tasks performed by the primary and inverter controllers illustrated in FIG. 2.

FIG. 3 is a schematic diagram of the functions and/or tasks performed by the primary and inverter controllers 201, 202. The same functions and/or tasks can be performed by a single controller in the embodiment where the primary and inverter controllers 201, 202 are combined.

The primary controller 201 is configured to receive as an input a target grid power signal 310 that represents the target power provided by the power grid 132 and/or the blend/percentage of total output power to the load(s) 190 that is provided by the power grid 132, with the balance provided by the generator 120. The target grid power signal 310 can be input from a system operator such as through computer 182 (FIG. 1). The primary controller 201 is also configured to receive as an input a grid power feedback signal 312 that represents the actual grid power provided or output by the power grid 132. The grid power feedback signal 312 can be output from a power meter 134 (FIG. 1) that is electrically coupled to the input line to the second rectifier 142 or to the input line to the second DC-DC converter 152. The power meter 134 is in electrical communication with the primary controller 201 and/or the controller(s) 180.

A difference between the target power and the actual power provided by the power grid 132 is input to a PID controller 320. The difference between the target power and the actual power can be calculated by a comparator 322 or another device. The comparator 322 has inputs electrically coupled to the target grid power signal 310 and the grid power feedback signal 312 and an output electrically coupled to the PID controller 320. The output of the PID controller 320 is an engine speed target signal 331 that represents a target speed (e.g., RPMs) of the engine 110.

The inverter controller 202 receives as inputs the engine speed target signal 331, a DC bus voltage signal 332, a grid current signal 333, and a generator current signal 334. The engine speed target signal 331 and an actual or measured engine speed signal 335 are input to a first comparator 341. The actual engine speed signal 335 represents the actual/measured engine speed output from the speed controller 112 (FIG. 1), which is in mechanical and/or electrical communication with the engine 110 and/or shaft 122. The first comparator 341 outputs the difference between the engine speed target and the actual engine speed, which is provided as an input to a first PID controller 351. The first PID controller 351 produces as an output signal that can be used by a current controller 390 to produce a first reference current signal 361 that is or represents a first reference current.

The first reference current signal 361 and the generator current signal 334 are input to a second comparator 342. The generator current signal 334 is or represents a measured current output from the current sensor 124 (FIG. 1) that can be electrically coupled to the input line to the first DC-DC converter 151 or to the input line to the first rectifier 141. The second comparator 342 outputs the difference between the first reference current and the measured generator current output, which is provided as an input to a second PID controller 352. The second PID controller 352 produces as an output a first duty-cycle output signal, which is provided as an input to a first pulse-width modulator circuit 371. The first pulse-width modulator circuit 371 produces a first pulse-width modulated (PWM) signal 373 based on the first duty-cycle output signal. The first PWM signal 373 is provided as an input to the first DC-DC converter 151 which can vary the current/power provided to and the voltage of the DC bus 160, provided by the generator 120, based on the duty cycle of the first PWM signal 373.

The DC bus voltage signal 332 and a DC bus voltage target signal 363 are input to a third comparator 343. The DC voltage signal 332 is provided as an output of the voltage sensor 162 (FIG. 1) The DC bus voltage target signal 363 can be provided by a system operator (e.g., via computer 182) or as a feedback signal from the load controller 191. For example, the DC bus voltage target signal 363 can represent the DC voltage requirement (and indirectly the power requirement) to supply the AC requirement of the load(s) 190. The third comparator 343 outputs the difference between the measured DC bus voltage and the target DC bus voltage, which is provided as an input to a third PID controller 353. The third PID controller 353 produces an output signal that can be used by the current controller 390 to produce a second reference current signal 362 that is or represents a second reference current.

The second reference current signal 362 and the grid current signal 333 are input to a fourth comparator 344. The grid current signal 333 is or represents a measured current output from the current sensor 126 (FIG. 1) that can be electrically coupled to the input line to the second DC-DC converter 152 or to the input line to the second rectifier 142. The fourth comparator 344 outputs the difference between the second reference current and the measured grid current output, which is provided as an input to a fourth PID controller 354. The fourth PID controller 354 produces as an output a second duty-cycle output signal, which is provided as an input to a second pulse-width modulator circuit 372. The second pulse-width modulator circuit 372 produces a second PWM signal 374 based on the second duty-cycle output signal. The second PWM signal 374 is provided as an input to the second DC-DC converter 152 which can vary the current/power provided to and the voltage of the DC bus 160, provided by the power grid 132, based on the duty cycle of the second PWM signal 374. For example, the second PWM signal 374 can cause the voltage of the DC bus 160 to remain steady in response to variations in the power requirements of the load(s) 190.

The input signals to the second and fourth PID controllers 352, 354 can pass through respective optional current-limit detectors 382, 384. The current-limit detectors 382, 384 can determine whether a requested increase in current to be provided by the generator 120 or power grid 132 is above a respective predetermined maximum current limit. When the requested increase causes the respective current from the generator 120 or power grid 132 to be above the respective predetermined maximum current limit, the current-limit detectors 382, 384 can produce a respective maximized current difference signal that causes the respective current from the generator 120 or power grid 132 to be equal to the respective predetermined maximum current limit.

The inverter controller 202 can also include a current controller 390 that can arbitrate the output signals of the first and third PID controllers 351, 353 and can determine the first and second reference current signals 361, 362 which can be based, at least in part, on the output signals of the first and third PID controllers 351, 353. The current controller 390 can be used to maintain the engine in the high-efficiency, unthrottled condition. The current controller 390 gives priority to calculating and updating the first reference current signal 361 so that the engine does not stall on sudden increases needed by the load(s) 190. In addition, the current controller 390 adjusts the second reference current signal 362 to maintain the proper DC bus voltage 332.

To startup the hybrid power system 10, the engine 110 and inverter 170 are each started and await interconnection to the load(s) 190. The speed of the engine 110 is controlled to a fixed RPM utilizing conventional throttling since the engine 110 is unloaded. Next, power is supplied from the inverter 170 to the load(s) 190 in sufficient quantity to maintain a specified voltage waveform, which can be requested by the controller(s) of the load(s) 190. The load controller 191 would be the control device that determines the necessary output of the motor(s) to achieve the desired process result. For example, if the motors were powering a chiller's compressor, the desired result would be a chilled water temperature setpoint or target. If the chilled water temperature were above setpoint, the chiller's controller would desire a higher compressor motor RPM to increase the cooling rate. The chiller's controller would relay this command to the primary controller 201 which would, in turn, further relay the command to the inverter controller 202 which would increase its output frequency and thereby increase the motor RPM proportionately. The compressor, by operating its motor at a higher RPM, would achieve increased cooling.

Next, the primary controller 201 receives the target grid power input signal 310 and the grid power feedback signal 312 and outputs the engine speed target signal 331, which corresponds to the target speed of the engine 110 that would achieve the power blend indicated by the target grid power input signal 310.

The first PID controller 351 produces a first output signal that is used by the current controller 390 to produce a first current reference signal 361 that corresponds to a target current to be produced by the generator 120 according to the difference between the target and measured speed of the engine 110. The difference between the first target current and the actual generator current (e.g., generator current signal 334) is input to the second PID controller 352 to determine a first duty cycle that is fed back to the first DC-DC converter 151 in the first PWM signal 373. The first PWM signal 373 determines the amount of current provided by the generator 120.

The third PID controller 353 produces a second output signal that is used by the current controller 390 to produce a second current reference signal 362 that corresponds to a target current to be produced by the generator 120 according to the difference between the target and measured voltage of the DC bus 160. The second target current and the actual power grid current (e.g., grid current signal 333 are compared to determine a second duty cycle which is fed back to the second DC-DC converter 152 in the second PWM signal 374. The second PWM signal 374 determines the amount of current provided by the power grid 132.

When the current requirement of the load(s) 190 increases, the voltage of the DC bus 160 will decrease. This change in the DC bus voltage is input to the inverter controller 202 as the measured voltage of the DC bus 160 (e.g., DC bus voltage signal 332). The decrease in DC bus voltage is initially compensated for by an increase in current provided by the power grid 132. For example, the inverter controller 202 increases the second duty cycle of the second PWM signal 374, which is fed back to the second DC-DC converter 152 to increase the current from the power grid 132. The increase in current and power provided by the power grid 132 is compensated for in the primary controller 201 where PID controller 320 increases the target engine speed represented in the engine speed target signal 331. The increase in the engine speed target signal 331 increases the first reference current 361, which increases the first duty cycle of the first PWM output signal 373. The first PWM output signal 373 is fed back to the first DC-DC converter 151, which increases the current provided by the generator 120. An increase in current provided by the generator 120 causes a corresponding increase in the speed of the engine 110. Because the engine 110 is running at wide-open throttle, increasing the engine speed will increase the generator power input to the inverter 170 and thereby decrease the power grid input.

Similarly, when the current requirement of the load(s) 190 decreases, the voltage of the DC bus 160 will increase. This change in the DC bus voltage is input to the inverter controller 202 as the measured voltage of the DC bus 160 (e.g., DC bus voltage signal 332). The current in DC bus voltage is initially compensated for by a decrease in current provided by the power grid 132. For example, the inverter controller 202 decreases the second duty cycle of the second PWM signal 374, which is fed back to the second DC-DC converter 152 to decrease the current from the power grid 132. The decreases in current and power provided by the power grid 132 is compensated for in the primary controller 201 where PID controller 320 decreases the target engine speed represented in the engine speed target signal 331. The decrease in the engine speed target signal 331 decreases the first reference current 361, which decreases the first duty cycle of the first PWM output signal 373. The first PWM output signal 373 is fed back to the first DC-DC converter 151, which decreases the current provided by the generator 120. A decrease in current provided by the generator 120 causes a corresponding decrease in the speed of the engine 110. Because the engine 110 is running at wide-open throttle, decreasing the engine speed will decrease the generator power input to the inverter 170 and thereby increase the power grid input.

One or more of the PID controllers 351-354 can be replaced with another controller such as a proportional-integral (PI) controller, a proportional controller, or another controller.

Various aspects of the electrical generation and conversion technology described herein are disclosed in U.S. Pat. No. 7,239,034, titled "Engine Driven Power Inverter System with Cogeneration," which is hereby incorporated by reference.

As can be seen, the system 10 illustrated in FIGS. 1-3 allows an alternative and novel control strategy to be utilized that allows modulation while maintaining a fixed and open throttle that will be impervious to rapid and large (100% of full rating) load swings. The control strategy includes the following two operating parameters, which are set independently and form the basis for the inverter's operation. They may be static settings or modified from time to time, as desired. The first parameter, target grid power input signal 310, represents the desired proportion of power to be drawn from the two power sources (e.g., generator 120 and power grid 132), and can be set by the system operator.

The second parameter, the inverter frequency and voltage output, is specified by the load controller 191, The load controller 191 would be the independent device controlling the driven load(s) 190 that determines the necessary output of the load(s) 190 to achieve the desired process result. For example, if the motors were powering a chiller's compressor, the desired result would be a chilled water temperature setpoint or target. If the chilled water temperature were above setpoint, the chiller's controller would desire a higher compressor motor RPM to increase the cooling rate. The chiller's controller (e.g., load controller 191) would relay this command to the primary controller 201 which would, in turn, further relay the command to the inverter controller which would increase the inverter 170 frequency and thereby increase the motor RPM proportionately. The compressor, by operating at a higher RPM, would achieve increased cooling.

As operation continues and loading changes, the RPM target is recalculated and maintained with the utility supply (e.g., power grid 132) assisting with step transients as needed to avoid engine stalling. If the VFD feature is utilized, and the connected load's controller initiates a new frequency target, the inverter will alter the waveform as commanded, and the RPM control strategy will continue independently.

The control operations described above can take place over very short durations such that unintended utility power utilization will be inconsequential and engine RPM control smooth and steady. When the load is suddenly decreased, such as during load shutdown, the opposite of engine stalling will occur; engine RPMs will accelerate. In this case, the engine throttle needs to quickly close to avoid an overspeed condition. An electronic governor can be used to bring the engine RPMs under control (e.g., below a maximum limit) when engine speed exceeds a prescribed RPM window.

Figure 4:
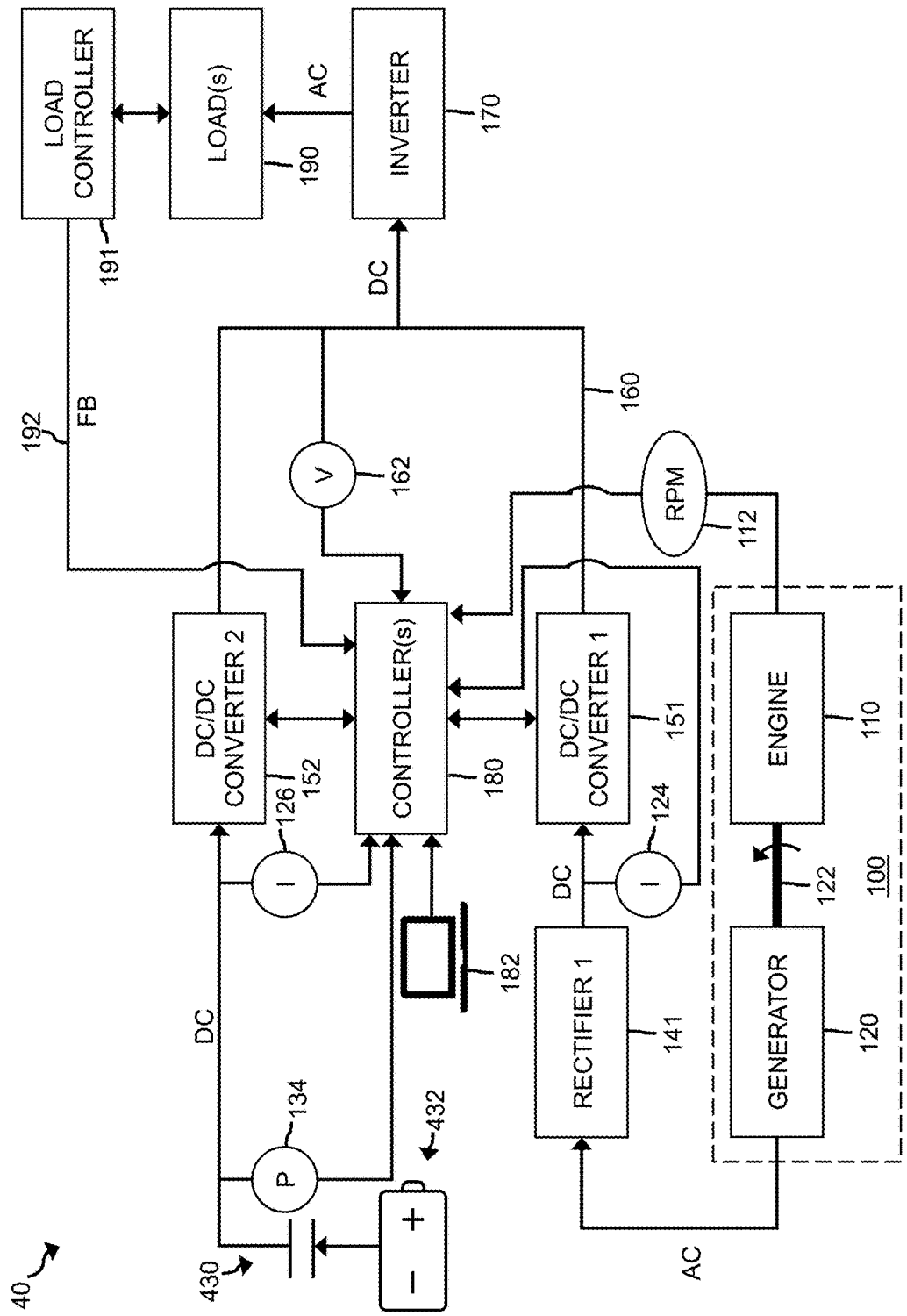
FIG. 4 is a block diagram of a hybrid power system according to another embodiment.

FIG. 4 is a block diagram of a hybrid power system 40 according to another embodiment. System 40 is the same as system 10 except as described herein. In system 40, the power grid 132 in system 10 is replaced with a DC voltage source 432, which can include, for example, one or more batteries, one or more supercapacitors, and/or a photovoltaic solar array. In addition, the electrical grid connection 130 in system 10 is replaced with a DC voltage source connection 430 that can be the same or different than the electrical grid connection 130. Since the DC voltage source 432 provides DC current and power, the second rectifier 142 is omitted in system 40. The operation of the system 40 including controller(s) 180 (which can include controllers 201, 202) is otherwise the same as system 10.

Figure 5:
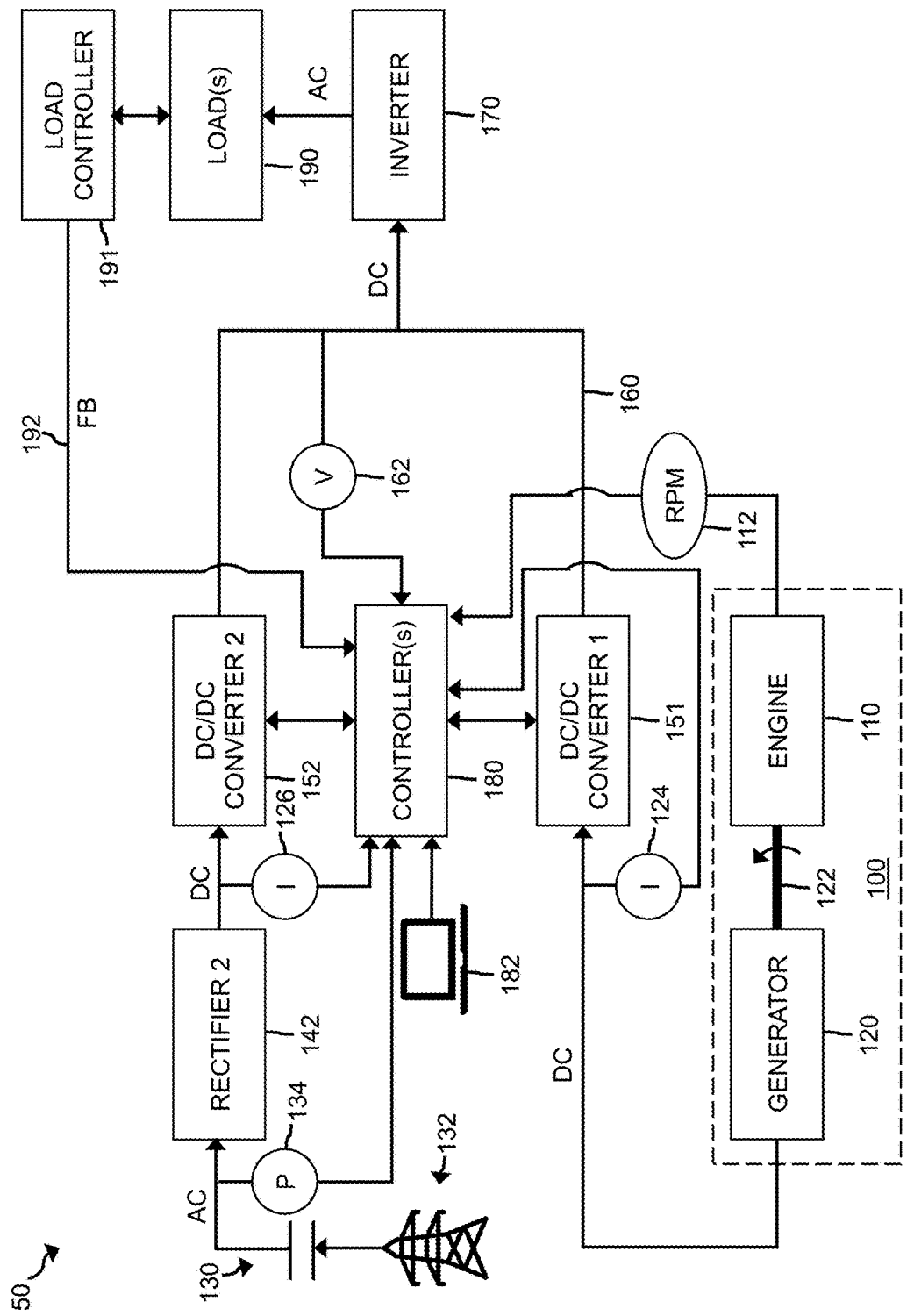
FIG. 5 is a block diagram of a hybrid power system according to another embodiment.

FIG. 5 is a block diagram of a hybrid power system 50 according to another embodiment. System 50 is the same as system 10 except as described herein. In system 50, the generator 120 is a DC generator instead of an AC generator. Since the generator 120 produces DC current and power, the first rectifier 141 is omitted in system 50. The operation of the system 50 including controller(s) 180 (which can include controllers 201, 202) is otherwise the same as system 10.

Figure 6:
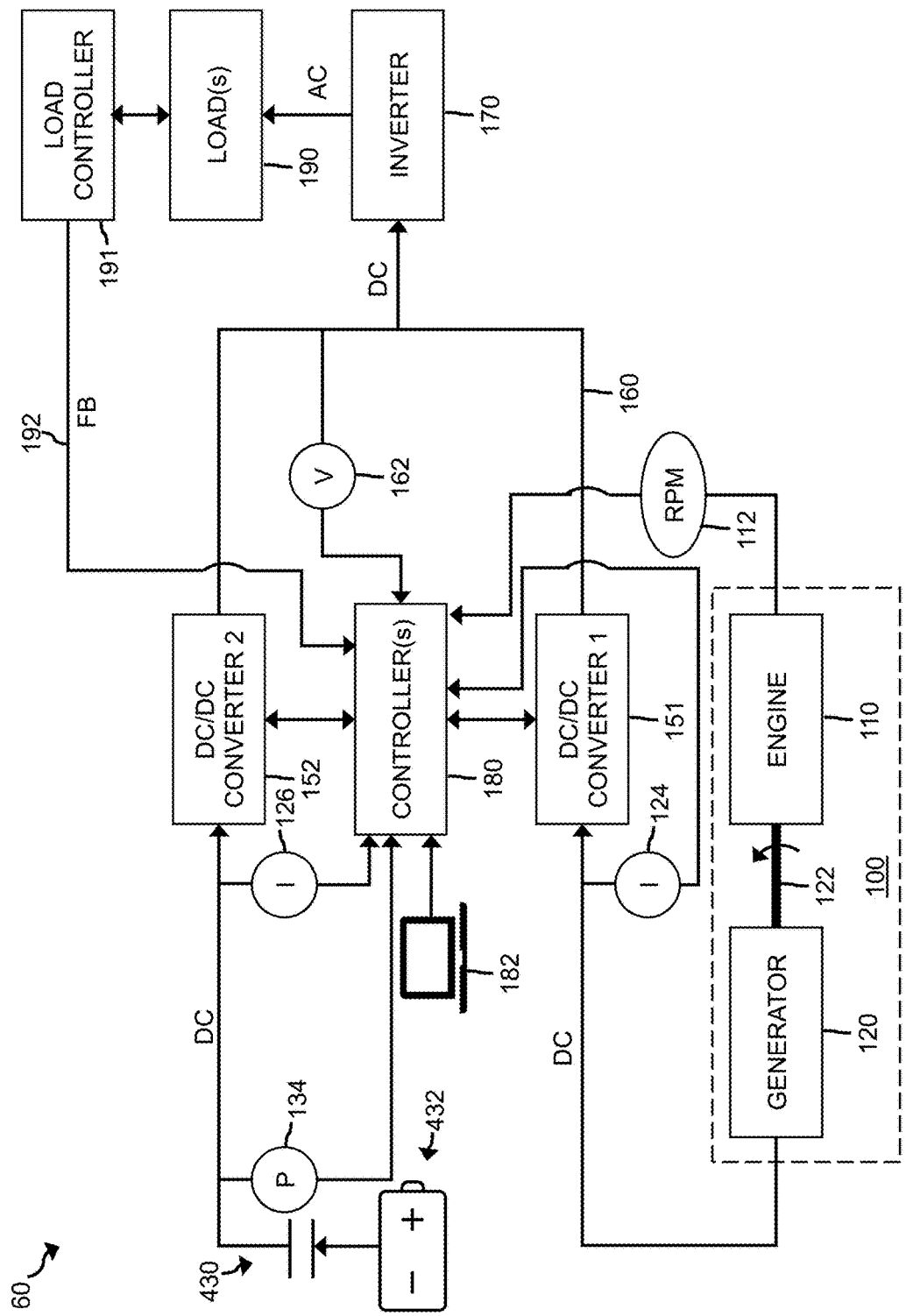
FIG. 6 is a block diagram of a hybrid power system according to another embodiment.

FIG. 6 is a block diagram of a hybrid power system 60 according to another embodiment. System 60 is the same as system 10 except as described herein. System 60 is a hybrid of system 40, 50 where both power/current sources provide DC power/current. Specifically, in system 60 the power grid 132 in system 10 is replaced with a DC voltage source 432, as described above. In addition, the electrical grid connection 130 in system 10 is replaced with a DC voltage source connection 430. In addition, the generator 120 is a DC generator instead of an AC generator. The first and second rectifiers 141, 142 are omitted in system 60. The operation of the system 60 including controller(s) 180 (which can include controllers 201, 202) is otherwise the same as system 10.

Figure 7:
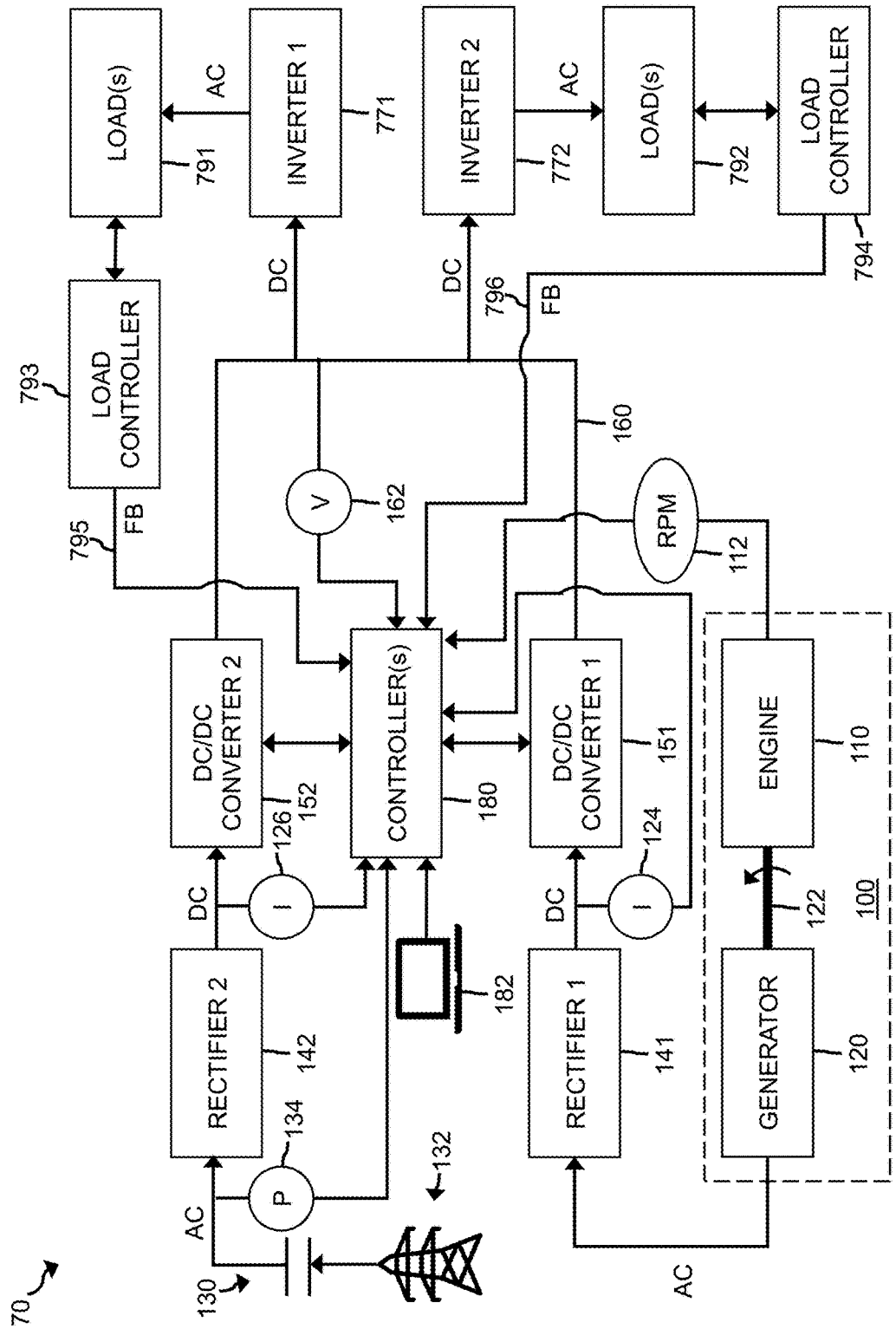
FIG. 7 is a block diagram of a hybrid power system according to another embodiment.

FIG. 7 is a block diagram of a hybrid power system 70 according to another embodiment. System 70 is the same as system 10 except that system 70 includes first and second inverters 771, 772 instead of the sole inverter 170 in system 10. Each inverter 771, 772 has an input that is electrically coupled to the DC bus 160. The inverters 771, 772 can modulate the respective output AC frequency to the respective loads 791, 792 based on feedback signals regarding the power requirements of the respective load(s), for example as provided by respective load controllers 793, 794. Each load controller 793, 794 can be the same as or different than load controller 191. Two or more inverters 771, 772 can be used in applications which include groups of motors/loads 791, 792 are powered simultaneously and where a single AC frequency is undesirable for some or all conditions. Each inverter 771, 772 can be controlled independently. For example, an air-cooled chiller has two motor load groups—the condenser fans and the refrigeration compressor(s)—which, in general, have dissimilar loading requirements. Power system 70 can be used in this example application.

The control of the power inputs from the generator 120 and utility grid 130 (e.g., using controller(s) 180 such as controllers 201, 202) remains the same (e.g., because there is no direct feedback from the loads to the power inputs from the generator 120 and utility grid 130) in systems 10, 70. The feedback control signals 795 and 796 from the load controllers 793 and 794 would be the frequency required to control the respective loads 791 and 792. These frequency control signals may be equivalent or different and would depend on the requirements of the system connected to the load (e.g. the air conditioning system described above).

Figure 8:
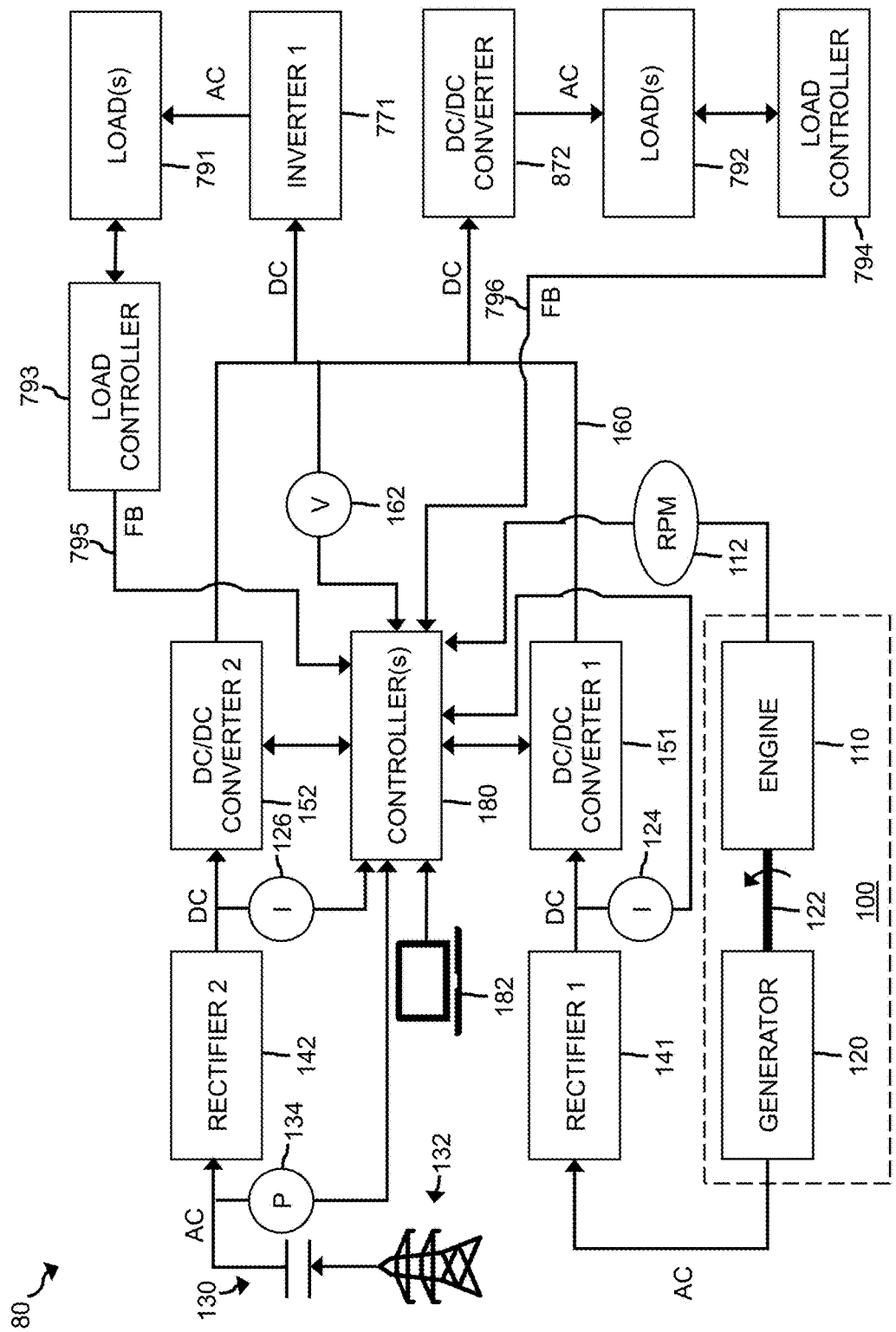
FIG. 8 is a block diagram of a hybrid power system according to another embodiment.

FIG. 8 is a block diagram of a hybrid power system 80 according to another embodiment. System 80 is the same as system 70 except that in system 80 the second inverter 772 of system 70 is replaced with a DC-DC converter 872 to supply DC power at the appropriate DC voltage for the secondary load(s) 792. The feedback control signal 796 from the load controller 794 can indicate the DC power or DC voltage required by the DC load(s) 792.

Figure 9:
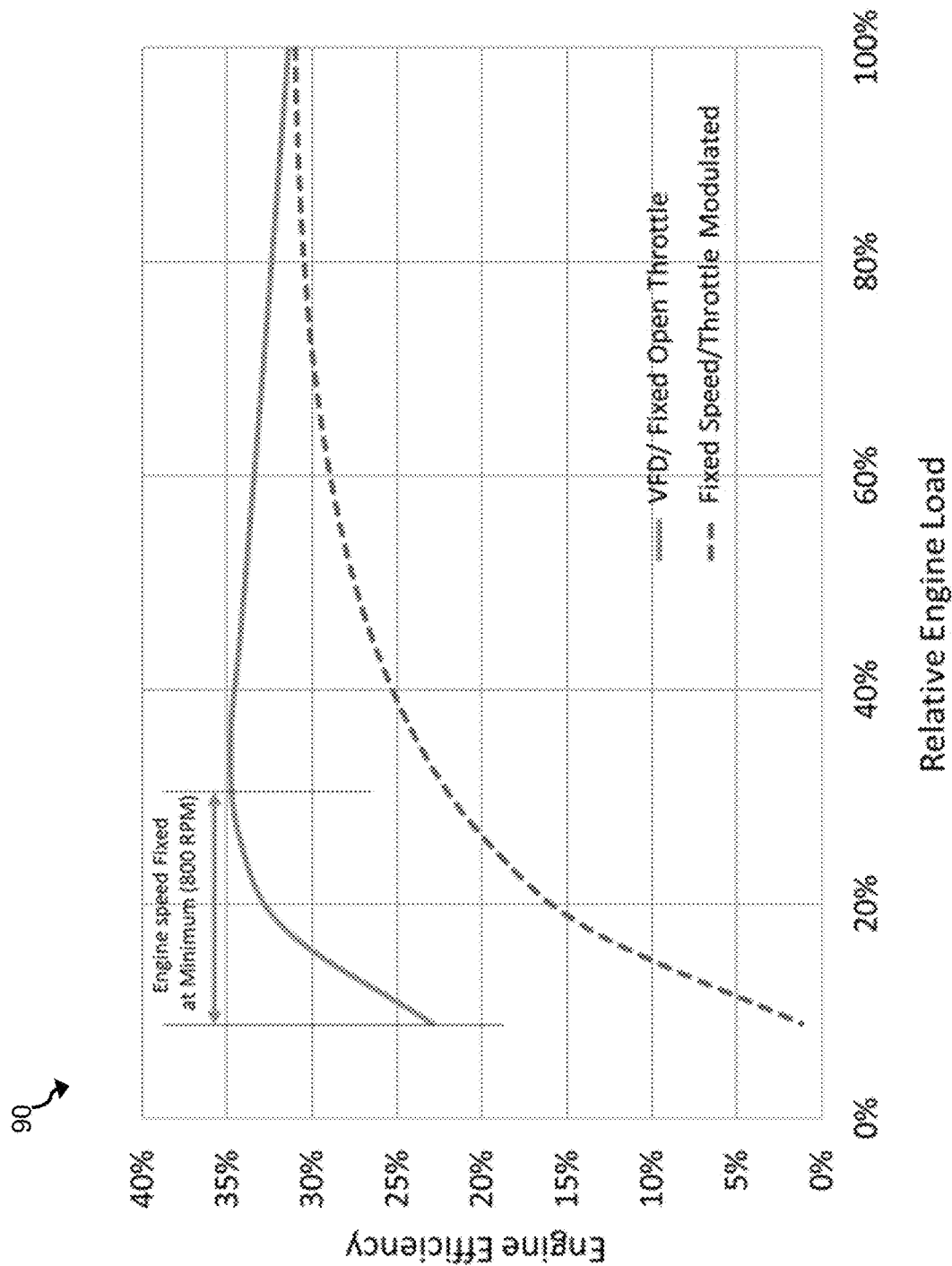
FIG. 9 is a graph of engine efficiency as a function of percentage load under different modulation strategies.

The relative impact of engine throttling versus speed modulation can be quantified utilizing test data for an engine whose performance has been characterized through its range of speed and torque, such as Tecogen's 7.4-liter V8 natural gas engine. FIG. 9 is a graph 90 that shows how the engine efficiency varies under these two modulation strategies from a starting point of 2800 RPM. As shown, the efficiency of the throttled/fixed speed engine decreases from its peak value at 100% output and drops thereafter, as load on the engine decreases (some throttling is required even at full load for stability, so it has a slightly less efficient starting point). On the other hand, as load on the engine decreases, the variable speed/fixed open throttle engine has a steadily improving efficiency until the engine's minimum operating speed is reached (800 RPM) after which throttling must be used, although to a less degree than the fixed speed (2800 RPM) engine. The improved efficiency at reduced RPM values is due to unrelated factors impacting efficiency that are less significant with reduced RPM (friction, windage, thermodynamics, etc.)

Because the negative impact of throttling is most pronounced at the lower power outputs, the variable speed/fixed open throttle strategy has most significant impact in applications where the loading is often below the full rating of the engine. Air conditioners are a good example, as is evident in the industry's standard for rating product on a seasonal basis. The Air-Conditioning, Heating, and Refrigeration Institute (AHRI), the trade association representing manufacturers of AC and water heating equipment within the global industry, specifies four rating points for determining the seasonal efficiency of AC products which are weighted according to the relative time most applications would find the equipment utilized. These rating points are 100%, 75%, 50% and 25% of capacity for which weighted time of utilization factors are applied: 1%, 42%, 43% and 12% (33% average). Air-conditioners, therefore, are utilized, on average, at 33% capacity where speed modulation has substantial benefit. The specific examples and values provided are for the sake of illustration and are not limiting or exhaustive. Those skilled in the art will understand that other or equivalent implementations and embodiments are also possible consistent with the present disclosure and are therefore equally comprehended hereby.

Embodiments of the invention can provide one or more advantages. First, a unique configuration for power modulation control using grid power or engine power depending upon demand load from powered devices allows the modulation of power output to the loads while the engine (e.g., engine 110) remains at a fixed and open throttle position which significantly increases efficiency because throttling losses are eliminated.

Second, the engine(s) (e.g., engine 110) can be powered by a low-cost fuel source, such as natural gas, thereby reducing operating costs relative to using grid supplied electricity. Alternate electric sources, other than the utility, may be used, including DC technologies such as batteries, super capacitors, or solar photovoltaic systems, as described above.

Third, a byproduct of the engine drive system is waste heat from the engine jacket and exhaust which can provide onsite process heating like a conventional CHP system (e.g., CHP system 100).

Fourth, in cases where the engine waste heat is used, it would be possible to run the engine in a manner such that it supplies only the amount of heat required, the remainder of the required power for the loads coming from the second power input. This mode of operation may be advantageous from an economic standpoint and could eliminate the need for a radiator to remove engine heat while also maintaining peak overall process efficiency as the power generated by the engine is always accompanied by waste heat utilization.

Fifth, because the system would have no ability to export electrical energy to the power grid, at least in some embodiments, it would avoid power grid interconnection permitting and problematic electrical tariffs (standby and departing load charges, etc.).

Sixth, in cases where motor loads are suited to modulation by frequency variation, additional improvement in operating cost and efficiency would be realized, as with conventional VFD drives.

Seventh, where utility tariffs are time-of-day and/or seasonally modified, operation could be scheduled to utilize the least-expensive energy source in situations when the cost of natural gas (or other fuel inputs) use exceeds the cost of grid power.

Eighth, where utilities apply tariffs that include "peak shaving" charges (those proportional to the greatest rate of energy use over a short interval), the blending can be shifted from the utility source on a daily (and seasonal basis) to minimize these charges.

Nineth, when operated primarily using the engine-generator as the power source, engine service shutdowns would be accompanied by a seamless transition to the electrical grid or other alternate power source with no interruption to the powered loads. Similarly, if the electric grid service were interrupted, operation would continue with the engine-generator with no interruption as well and only a short interruption to start the engine if it is not operating at the onset of the outage. The system's redundant power sourcing, therefore, provides increased resiliency as compared to either source singularly applied.

Tenth, when utilizing the engine-generator and during motor startup when power demand is very high, the inverter would draw extra power from the utility grid for short times.

Eleventh, it would also be possible to size the VFD for a large load so that the engine-driven generator always runs heavily loaded, and the utility input is used only at times of very high-power demand from the powered devices. This scheme would also allow seamless changeover to backup power if connection to the power grid is lost, or connection to the power grid if the generator were to fault.

The technology provides a unique method of joining two power sources such that the relative proportion utilized can be changed to any value seamlessly. Additionally, and because the AC output portion of the circuit is independent of the utility grid, power can be supplied at variable frequencies to motor loads, with significant, positive impacts in load efficiency. In addition, the DC-DC converter portion of the circuit can be used as a constant voltage "manifold" from which multiple outputs can emanate with alternative specifications relative to voltage (AC or DC) and frequency to the primary inverter output. In addition, the technology allows a novel method of power modulation whereby power increases which occur stepwise or over a short duration can utilize the second, non-engine sourced power to assist for the brief transient, allowing the engine, which is maintained at a fixed and wide-open-throttle position, to continue operation and in a more gradual process to resume its blend target for power generation.

The invention should not be considered limited to the particular embodiments described above. Various modifications, equivalent processes, as well as numerous structures to which the invention may be applicable, will be readily apparent to those skilled in the art to which the invention is directed upon review of this disclosure. The above-described embodiments may be implemented in numerous ways. One or more aspects and embodiments involving the performance of processes or methods may utilize program instructions executable by a device (e.g., a computer, a processor, or other device) to perform, or control performance of, the processes or methods.

In this respect, various inventive concepts may be embodied as a non-transitory computer readable storage medium (or multiple non-transitory computer readable storage media) (e.g., a computer memory of any suitable type including transitory or non-transitory digital storage units, circuit configurations in Field Programmable Gate Arrays or other semiconductor devices, or other tangible computer storage medium) encoded with one or more programs that, when executed on one or more computers or other processors, perform methods that implement one or more of the various embodiments described above. When implemented in software (e.g., as an app), the software code may be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer, as non-limiting examples. Additionally, a computer may be embedded in a device not generally regarded as a computer but with suitable processing capabilities, including a Personal Digital Assistant (PDA), a smartphone or any other suitable portable or fixed electronic device.

Also, a computer may have one or more communication devices, which may be used to interconnect the computer to one or more other devices and/or systems, such as, for example, one or more networks in any suitable form, including a local area network or a wide area network, such as an enterprise network, an intelligent network, or the Internet. Such networks may be based on any suitable technology and may operate according to any suitable protocol and may include wireless networks or wired networks.

Also, a computer may have one or more input devices and/or one or more output devices. These devices can be used, among other things, to present a user interface. Examples of output devices that may be used to provide a user interface include printers or display screens for visual presentation of output and speakers or other sound generating devices for audible presentation of output. Examples of input devices that may be used for a user interface include keyboards, and pointing devices, such as mice, touch pads, and digitizing tablets. As another example, a computer may receive input information through speech recognition or in other audible formats.

The non-transitory computer readable medium or media may be transportable, such that the program or programs stored thereon may be loaded onto one or more different computers or other processors to implement various one or more of the aspects described above. In some embodiments, computer readable media may be non-transitory media.

The terms "program," "app," and "software" are used herein in a generic sense to refer to any type of computer code or set of computer-executable instructions that may be employed to program a computer or other processor to implement various aspects as described above. Additionally, it should be appreciated that, according to one aspect, one or more computer programs that when executed perform methods of this application need not reside on a single computer or processor, but may be distributed in a modular fashion among a number of different computers or processors to implement various aspects of this application.

Computer-executable instructions may be in many forms, such as program modules, executed by one or more computers or other devices. Generally, program modules include routines, programs, objects, components, data structures, etc. that performs particular tasks or implement particular abstract data types. The functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Thus, the disclosure and claims include new and novel improvements to existing methods and technologies, which were not previously known nor implemented to achieve the useful results described above. Users of the method and system will reap tangible benefits from the functions now made possible on account of the specific modifications described herein causing the effects in the system and its outputs to its users. It is expected that significantly improved operations can be achieved upon implementation of the claimed invention, using the technical components recited herein.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

What is claimed is:

1. A hybrid power-generator system comprising:
an engine that runs with a wide-open throttle;
an electric generator mechanically coupled to the engine to produce a generator alternating current (AC) having a frequency;
a first rectifier having an input that is electrically coupled to an output of the electric generator, the first rectifier configured to rectify the generator AC to a generator direct current (DC);
a second rectifier having an input that is electrically coupled to an electric grid to receive a grid AC, the second rectifier configured to rectify the grid AC to a grid DC;
a first DC-DC voltage converter having an input that is electrically coupled to an output of the first rectifier to receive the generator DC;
a second DC-DC voltage converter having an input that is electrically coupled to an output of the second rectifier to receive the grid DC;
a DC bus electrically coupled to an output of the first DC-DC voltage converter and to an output of the second DC-DC voltage converter;
an inverter electrically coupled to the DC bus, the inverter supplying an inverter AC to a load motor;
a first controller that receives as inputs a grid power target signal and a grid power feedback signal and produces an engine speed target signal based, at least in part, on the grid power target signal and the grid power feedback signal; and
a second controller that receives as inputs the engine speed target signal, an engine speed feedback signal, a DC bus voltage feedback signal, and a DC bus target voltage signal, and produces first and second duty-cycle output signals based, at least in part, on the engine speed target signal, the engine speed feedback signal, the DC bus voltage feedback signal, and the DC bus target voltage signal,
wherein:
the first duty-cycle output signal sets a duty cycle of the first DC-DC voltage converter,
the second duty-cycle output signal sets a duty cycle of the second DC-DC voltage converter, and
the duty cycle of the first DC-DC voltage converter causes the engine to operate at a corresponding speed.

2. The system of claim 1, wherein:
the grid power target signal indicates a target grid power from the electric grid,
the grid power feedback signal indicates an actual grid power from the electric grid, and
the first controller produces the engine speed target signal based, at least in part, on a difference between the target grid power and the actual grid power.

3. The system of claim 2, wherein the first controller includes a proportional-integral-derivative controller.

4. The system of claim 1, wherein:
the engine speed target signal corresponds to a target speed of the engine,
the engine speed feedback signal corresponds to an actual speed of the engine,
the DC bus voltage feedback signal corresponds to an actual voltage of the DC bus,
the DC bus target voltage signal corresponds to a target voltage of the DC bus, and
the second controller produces the first and second duty-cycle output signals based, at least in part, on a difference between the target speed and the actual speed of the engine and a difference between the target voltage and the actual voltage of the DC bus.

5. The system of claim 4, wherein the second controller includes:
a first proportional-integral-derivative (PID) controller that receives as an input an engine speed difference signal that corresponds to the difference between the target speed and the actual speed of the engine, the first PID controller producing a first output signal;
a second PID controller that receives as an input a DC bus voltage difference signal that corresponds to the difference between the target voltage and the actual voltage of the DC bus, the second PID controller producing a second output signal;
a current controller that receives as inputs the first and second output signals, the current controller producing first and second reference currents;
a third PID controller that receives as an input a first current difference signal that corresponds to a difference between the first reference current and the generator DC, the third PID controller producing the first duty-cycle output signal; and
a fourth PID controller that receives as an input a second current difference signal that corresponds to a difference between the second reference current and the grid DC, the fourth PID controller producing the second duty-cycle output signal.

6. The system of claim 5, wherein the second controller includes:

a first pulse-width modulator (PWM) that receives as an input the first duty-cycle output signal, the first PWM producing a first pulse-width modulated signal based on the first duty-cycle output signal; and a second PWM that receives as an input the second duty-cycle output signal, the second PWM producing a second pulse-width modulated signal based on the second duty-cycle output signal, wherein:
the first DC-DC voltage converter is configured to convert a voltage of the generator DC using the first pulse-width modulated signal, the first pulse-width modulated signal having the first duty cycle, and the second DC-DC voltage converter is configured to convert a voltage of the grid DC using the second pulse-width modulated signal, the second pulse-width modulated signal having the second duty cycle.

7. The system of claim 6, wherein the second controller includes a first current-limit circuit that receives as an input the first current difference signal and that produces as an output:
the first current difference signal when a target generator DC is less than or equal to a maximum generator DC, and
a first maximized current difference signal when the target generator DC is greater than the maximum generator DC.

8. The system of claim 7, wherein the second controller includes a second current-limit circuit that receives as an input the second current difference signal and that produces as an output:
the second current difference signal when a target grid DC is less than or equal to a maximum grid DC, and
a second maximized current difference signal when the target grid DC is greater than the maximum grid DC.

9. The system of claim 1, wherein:
the inverter is a first inverter,
the load motor is a first load motor,
the inverter AC is a first inverter AC, and
the system further comprises:
a second inverter electrically coupled to the DC bus, the second inverter supplying a second inverter AC to a second load motor.

10. The system of claim 1, wherein:
the load motor is a first load motor, and
the system further comprises:
a third DC-DC converter electrically coupled to the DC bus, the third DC-DC converter supplying a DC power to a second load motor.

11. The system of claim 1, wherein the engine and the electric generator are components of a combined heat and power system.

12. The system of claim 1, further comprising a combined controller that includes the first and second controllers.

13. A hybrid power-generator system comprising:
an engine that runs with a wide-open throttle;
an electric generator mechanically coupled to the engine to produce a generator direct current (DC) having a generator voltage;
a rectifier having an input that is electrically coupled to an electric grid to receive a grid AC, the rectifier configured to rectify the grid AC to a grid DC;
a first DC-DC voltage converter having an input that is electrically coupled to an output of electric generator to receive the generator DC;

a second DC-DC voltage converter having an input that is electrically coupled to an output of the rectifier to receive the grid DC;
a DC bus electrically coupled to an output of the first DC-DC voltage converter and to an output of the second DC-DC voltage converter;
an inverter electrically coupled to the DC bus, the inverter supplying an inverter AC to a load motor;
a first controller that receives as inputs a grid power target signal and a grid power feedback signal and produces an engine speed target signal based, at least in part, on the grid power target signal and the grid power feedback signal; and
a second controller that receives as inputs the engine speed target signal, an engine speed feedback signal, a DC bus voltage feedback signal, and a DC bus target voltage signal, and produces first and second duty-cycle output signals based, at least in part, on the engine speed target signal, the engine speed feedback signal, the DC bus voltage feedback signal, and the DC bus target voltage signal, wherein:
the first duty-cycle output signal sets a duty cycle of the first DC-DC voltage converter,
the second duty-cycle output signal sets a duty cycle of the second DC-DC voltage converter, and
the duty cycle of the first DC-DC voltage converter causes the engine to operate at a corresponding speed.

14. A hybrid power-generator system comprising:
an engine that runs with a wide-open throttle;
an electric generator mechanically coupled to the engine to produce a generator alternating current (AC) having a frequency;
a first rectifier having an input that is electrically coupled to an output of the electric generator, the first rectifier configured to rectify the generator AC to a generator direct current (DC);
a first DC-DC voltage converter having an input that is electrically coupled to an output of the first rectifier to receive the generator DC;
a second DC-DC voltage converter having an input that is electrically coupled to an output of an auxiliary DC power source;
a DC bus electrically coupled to an output of the first DC-DC voltage converter and to an output of the second DC-DC voltage converter;
an inverter electrically coupled to the DC bus, the inverter supplying an inverter AC to a load motor;
a first controller that receives as inputs a grid power target signal and a grid power feedback signal and produces an engine speed target signal based, at least in part, on the grid power target signal and the grid power feedback signal; and
a second controller that receives as inputs the engine speed target signal, an engine speed feedback signal, a DC bus voltage feedback signal, and a DC bus target voltage signal, and produces first and second duty-cycle output signals based, at least in part, on the engine speed target signal, the engine speed feedback signal, the DC bus voltage feedback signal, and the DC bus target voltage signal, wherein:
the first duty-cycle output signal sets a duty cycle of the first DC-DC voltage converter,
the second duty-cycle output signal sets a duty cycle of the second DC-DC voltage converter, and the duty cycle of the first DC-DC voltage converter causes the engine to operate at a corresponding speed.

15. The system of claim 14, wherein the auxiliary DC power source comprises one or more batteries, one or more supercapacitors, a photovoltaic solar array, or other DC power source.

* * * * *